(12) United States Patent
Robertson

(10) Patent No.: US 8,146,534 B1
(45) Date of Patent: Apr. 3, 2012

(54) GIMBAL-MOUNTED PET DISH

(76) Inventor: William L. Robertson, Charleston, SC (US)

( * ) Notice: Subject to any disclaimer, the term of this patent is extended or adjusted under 35 U.S.C. 154(b) by 135 days.

(21) Appl. No.: 12/577,394

(22) Filed: Oct. 12, 2009

(51) Int. Cl.
*A01K 5/01* (2006.01)
*A01K 7/00* (2006.01)

(52) U.S. Cl. .................. 119/61.54; 119/61.57

(58) Field of Classification Search .......... 119/61.54, 119/68, 69, 72, 61.4, 61.57
See application file for complete search history.

(56) References Cited

U.S. PATENT DOCUMENTS

| | | | | |
|---|---|---|---|---|
| 772,713 | A | * | 10/1904 | Haas ............... 119/61.4 |
| 988,715 | A | * | 4/1911 | Jaeger ............. 119/61.4 |
| 1,102,371 | A | * | 7/1914 | Warren ............ 119/61.4 |
| 1,259,790 | A | * | 3/1918 | Shirley ............ 119/61.4 |
| 4,153,011 | A | * | 5/1979 | Weissman et al. ...... 119/72 |
| 4,436,056 | A | | 3/1984 | MacLeod |
| 4,587,930 | A | * | 5/1986 | Trego ............. 119/61.57 |
| 4,798,170 | A | * | 1/1989 | DePiazzy ......... 119/61.57 |
| 5,209,184 | A | | 5/1993 | Sharkan et al. |
| 5,297,504 | A | | 3/1994 | Carrico |
| D360,710 | S | * | 7/1995 | Colwell .......... D30/121 |
| 5,738,037 | A | * | 4/1998 | Mahan ............ 119/72 |
| 5,960,740 | A | | 10/1999 | Pestor |
| 6,032,824 | A | | 3/2000 | Barrow |
| 6,112,698 | A | | 9/2000 | Zelinger |
| 6,901,880 | B2 | * | 6/2005 | Hammer .......... 119/61.57 |
| 7,219,623 | B2 | * | 5/2007 | Flowers et al. .... 119/69.5 |
| 7,284,500 | B2 | * | 10/2007 | Denny et al. ..... 119/61.57 |
| 7,296,539 | B2 | | 11/2007 | Iljas |
| 7,806,081 | B2 | * | 10/2010 | Colvin et al. ......... 119/72 |
| 2006/0011142 | A1 | | 1/2006 | Walter |
| 2006/0060149 | A1 | | 3/2006 | Skowronski |
| 2007/0151010 | A1 | | 7/2007 | Ellerbe |

* cited by examiner

*Primary Examiner* — Yvonne Abbott
(74) *Attorney, Agent, or Firm* — Montgomery Patent & Design, LLC; Robert C. Montgomery; Joseph T. Yaksich

(57) ABSTRACT

A device for holding pet food or water with a gimbal mount for use in a moving environment, comprising a conventional food or water bowl used for pet comprising multiple features to facilitate its use on a boat or similar moving vehicle is herein disclosed. The device is fastened to a smooth wall surface by a plurality of suction cups which ensures that the device does not move around, but also elevates the bowl to a comfortable mounting height to allow the pet to drink or eat more easily and allows for easy cleaning below the bowl. The bowl is connected to the suction cup mount by a gimbal that allows rotation along both the x and y axis, thus enabling the bowl to always stay level no matter how the device is moved. The bowl comprises an inwardly turned rim which prevents splashing and spilling of water during movement.

14 Claims, 4 Drawing Sheets

GIMBAL-MOUNTED PET DISH

RELATED APPLICATIONS

The present invention was first described in a notarized Official Record of Invention on Oct. 23, 2008, that is on file at the offices of Montgomery Patent and Design, LLC, the entire disclosures of which are incorporated herein by reference.

FIELD OF THE INVENTION

The present invention relates generally to pet food and water dishes, and more particularly, to a pet food or water dish having a gimbal mount to provide food or water to a pet while preventing spilling in a moving environment.

BACKGROUND OF THE INVENTION

Pet food and water dishes are known and commonly used by the majority of pet owners. These dishes vary from simple plastic bowls to stylish ceramic or stainless steel bowls, and even to textile-based portable travel bowls. Improvements in design and materials have provided pet dishes which remain cool, have automatic refilling means, and elevated dishes which provide additional dining comfort to the pet. While these bowls vary by design and features, most pets still receive their food and water from a bowl that sits on a stable surface such as a floor. While this method works well in most situations, those pet owners who prefer to take their pets on travels or other activities face numerous disadvantages. While portable travel bowls may provide a pet dish that is simple to carry they too require that stable surface. The biggest disadvantage to traditional pet dishes is the tendency for spillage when the bowl is in a moving environment, such as a vehicle, a boat, or the like. Sometimes this movement can become so aggressive that the bowl not spills its contents, it also moves about the vehicle.

Various attempts have been made to solve this problem and provide a pet dish that reduces or eliminates spillage of its contents. These attempts can be seen by example in several U.S. patents. U.S. Pat. No. 4,436,056, issued in the name of MacLeod, describes a spill-resistant pet animal watering container having a water holding dish with sloping sides in combination with a snap-in lid and a center aperture large enough to allow a pet access to the contents.

U.S. Pat. No. 5,209,184, issued in the name of Sharkan et al., describes a pet travel bowl having a container with a sealable cover, a skirt, and a means to removably fasten the bowl to a surface to prevent movement.

U.S. Pat. No. 5,297,504, issued in the name of Carrico, describes a spill-resistant water container for pets having a refill feature, a low profile design which resists tipping, and a means to allow any spilled water to reenter the dish for consumption by the pet.

Additionally; U.S. Pat. No. 5,960,740, issued in the name of Pelsor, describes a splash and spill resistant water container for animal use; U.S. Pat. No. 6,032,824, issued in the name of Barrow, describes a spill-less water bowl for pets and small children which prevents the liquid contents from spilling over the edge of the bowl; and U.S. Pat. No. 7,296,539, issued in the name of Iljas, describes a spill resistant water and food dish for pets.

While these devices fulfill their respective, particular objectives, these attempts suffer from one or more disadvantages. While the likelihood of overturning and spillage of the contents may be reduced, all of these attempts still require the container to be seated on a flat stable surface. If that surface shifts to a non-horizontal angle due to a moving environment, the dish follows.

Accordingly, there exists a need for a means by which pets can be provided food and water in other moving environments without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a pet dish that can be utilized in a moving environment such as on a boat or in an automobile which ensures the dish doesn't move and maintains a level orientation and thus, the object of the present invention is to solve the aforementioned disadvantages and provides for this need.

Another object of the present invention is to provide a means to removably mount the pet dish to any smooth surface.

Another object of the present invention is to provide a pet dish which prevents splashing and spilling of its contents in a moving environment.

To achieve the above objectives, the present invention provides a gimbal mounted pet dish generally comprising a pet dish which maintains a level orientation relative to horizontal, a mounting frame which attaches to a vertical support surface, a "U"-shaped mounting frame which supports the pet dish, and a means to removably mount the mounting frame to the vertical support surface.

In a preferred embodiment, the mounting frame is attached to a vertical support surface via the fastening means. The mounting frame generally comprises a horizontal member affixed to the fastening means and a lower vertical member which extends downward from the horizontal member, where the lower vertical member comprises a standoff affixed to a lower end of the lower vertical member to provide a supported vertical mounting plane parallel to the vertical support surface.

In a preferred embodiment, the pet dish is removably attached to the "U"-shaped mounting frame and comprises curved side walls which define a cavity for holding pet food or water and an inwardly facing protrusion along an upper peripheral edge for reducing the tendency of the contents stored within to spill out.

The "U"-shaped mounting frame is hingedly attached to the mounting frame so as to be rotatable relative to the mounting frame via a rotating bearing which maintains a substantially horizontal plane about an axis perpendicular to the mounting frame for supporting the pet dish.

The pet dish is hingedly attached to the "U"-shaped mounting frame via two rotatable mounting pins so as to be rotatable relative to the "U"-shaped mounting frame to maintain a substantially horizontal plane about an axis parallel to the mounting frame. The rotatable mounting pins are provided on opposite upper external sides of the pet dish.

The "U"-shaped mounting frame comprises a rigid material having a flexing nature so as to allow distal ends to splay outward for attaching and removing said pet dish and receiving apertures through each distal end for insertably engaging the rotatable mounting pins on the pet dish.

Additionally, the fastening means comprises at least one large suction cup for removably attaching the mounting frame to a smooth, nonporous surface at a desired height and location with the use of suction.

The present invention provides a method of utilizing the device that provides pet owners the ability to provided food and water to their pets in a safe and secure manner on board a moving boat or similar moving environment.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
|---|---|
| 10 | gimbal-mounted pet dish |
| 15 | vertical surface |
| 20 | moving environment |
| 25 | mounting frame |
| 30 | two dimensional gimbal mechanism |
| 35 | pet dish |
| 40 | fastening means |
| 45 | distance "d" |
| 50 | floor surface |
| 55 | lower vertical member |
| 60 | standoff |
| 65 | fastener |
| 70 | rotating bearing |
| 75 | first direction path |
| 80 | "U"-shaped mounting frame |
| 85 | rotatable mounting pins |
| 90 | second direction path |
| 95 | bowl weight |
| 100 | bowl opening |
| 105 | inward facing protrusion |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
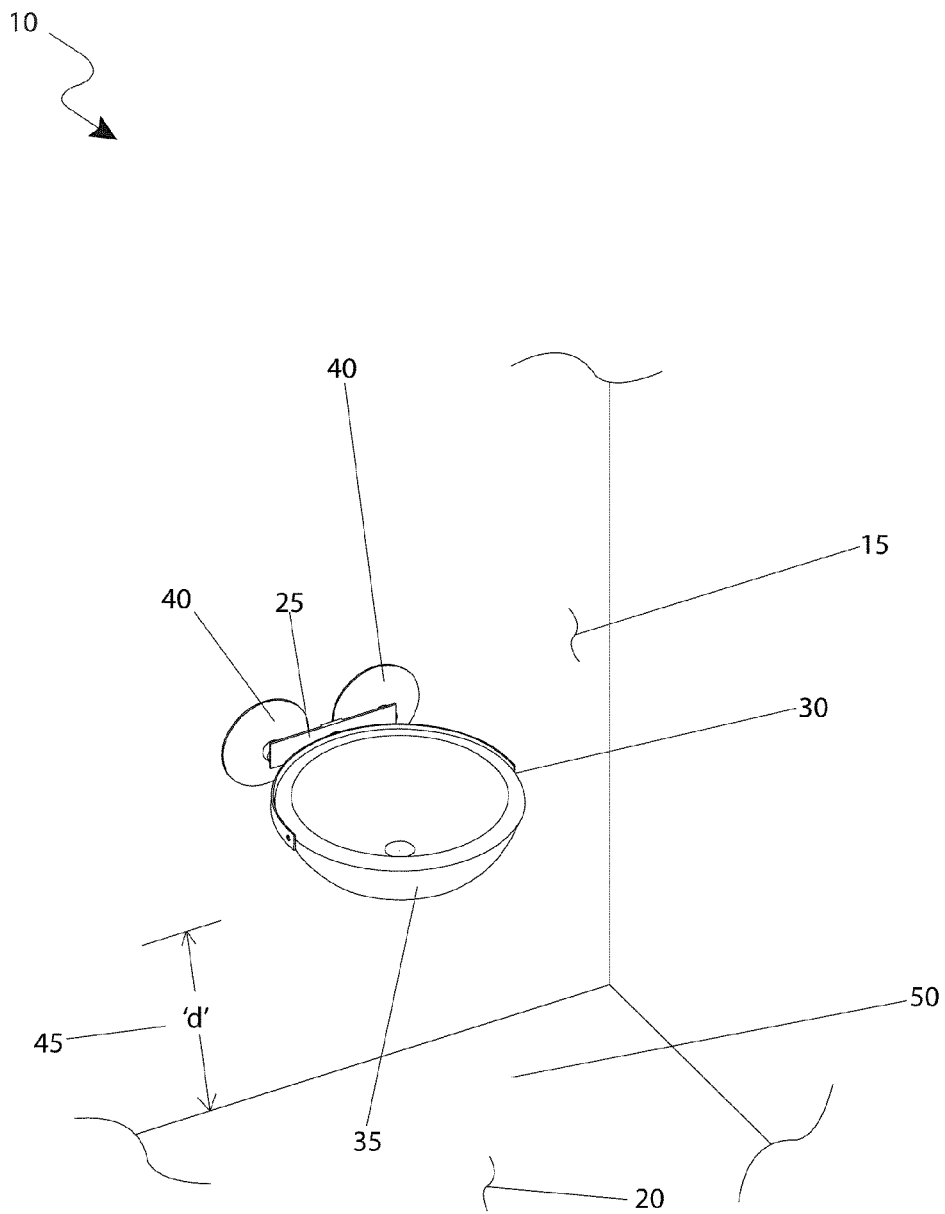
FIG. 1 is an isometric view of the gimbal-mounted pet dish 10, shown in an utilized state, according to the preferred embodiment of the present invention.

Referring now to FIG. 1, an isometric view of the gimbal-mounted pet dish 10, shown in a utilized state, according to the preferred embodiment of the present invention, is disclosed. The gimbal-mounted pet dish 10 is mounted to a vertical surface 15 such as a wall, bulkhead, cabinet, enclosure, or the like in a moving environment 20 such as a boat, recreational vehicle, crate, or the like. The gimbal-mounted pet dish 10 comprises a mounting frame 25 supporting a two-dimensional gimbal mechanism 30 which in turn holds a pet dish 35. The mounting frame 25 is held to the vertical surface 15 by use of a fastening means 40 herewith depicted as a set of large suction cups. Such depiction used here and in the remainder of the disclosure is for illustrative purposed only and is not meant to be a limiting factor of the present invention. Other methods of fastening means 40 such as mechanical fasteners, adhesive tape, hook-and-loop-type fastener, adhesive, and similar methods can be used with equal effectiveness. The gimbal-mounted pet dish 10 is mounted a distance "d" 45 above a floor surface 50 as shown. It is anticipated that a pet such as a dog or cat would stand upon the floor surface 50 when eating or drinking from the pet dish 35. The distance "d" 45 would be varied by the final user depending on the height of the pet. The elevated height of the pet dish 35 in comparison to a standard pet food or water bowl is envisioned to allow the pet to eat more easily as well as allow for the pet owner to clean and/or refill the bowl more easily due to its elevated position. It is envisioned that the gimbal-mounted pet dish 10 could be used for either food or water, but is viewed as more appropriate for use with water due to water's tendency to splash about and more readily spill when in a moving environment 20.

Figure 2:
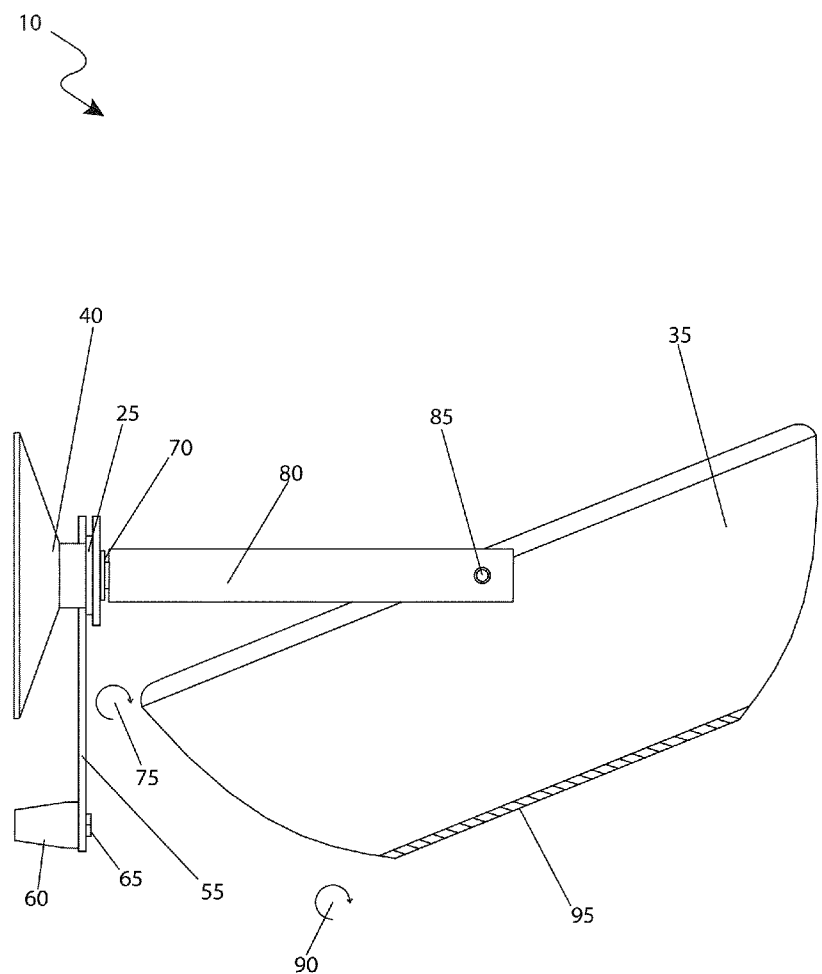
FIG. 2 is a side view of the gimbal-mounted pet dish 10 according to the preferred embodiment of the present invention.

Referring next to FIG. 2, a side view of the gimbal-mounted pet dish 10 according to the preferred embodiment of the present invention is depicted. This figure more clearly shows the operating mechanism of the mounting frame 25. The mounting frame 25 forms a horizontal member which engages the fastening means 40 (total of two (2), of which only one (1) is shown for illustrative purposes). To aid in stability, a lower vertical member 55 is provided extending downward from the mounting frame 25. The lower vertical member 55 is held in position via a standoff 60 secured via a fastener 65. Thus, it can be easily seen that the standoff 60 works in conjunction with the fastening means 40 to provide a nearly vertical origin plane in relation to the vertical surface 15. It should be noted that as the fastening means 40 is revised to different methods, as aforementioned described, the standoff 60 would vary in depth as well. Next, a rotating bearing 70 is physically mounted against the mounting frame 25. Said rotating bearing 70 provides for movement of the pet dish 35 as defined by a first direction path 75. Said motion is axial in design in relation to the rotating bearing 70 and rotates along viewing lines. A "U"-shaped mounting frame 80 is then mounted to the opposite side of the rotating bearing 70 and provides for the attachment to the pet dish 35 via two (2) rotatable mounting pins 85 (of which only one (1) is shown due to illustrative limitations). These two (2) rotatable mounting pins 85 allow the pet dish 35 to move or rotate as defined by a second direction path 90. In such a manner, the pet dish 35 can move in both the 'x' and 'y' axis and thus remain in a level or nearly level position, regardless of the movement of the vertical surface 15. To aid in keeping the pet dish 35 in a level or horizontal position, a bowl weight 95 is provided along the bottom of the pet dish 35. Thus, even if the pet dish 35 is not loaded or lightly loaded with contents, the pet dish 35 will still remain in a horizontal position with respect to the horizon or gravity at all times.

Figure 3:
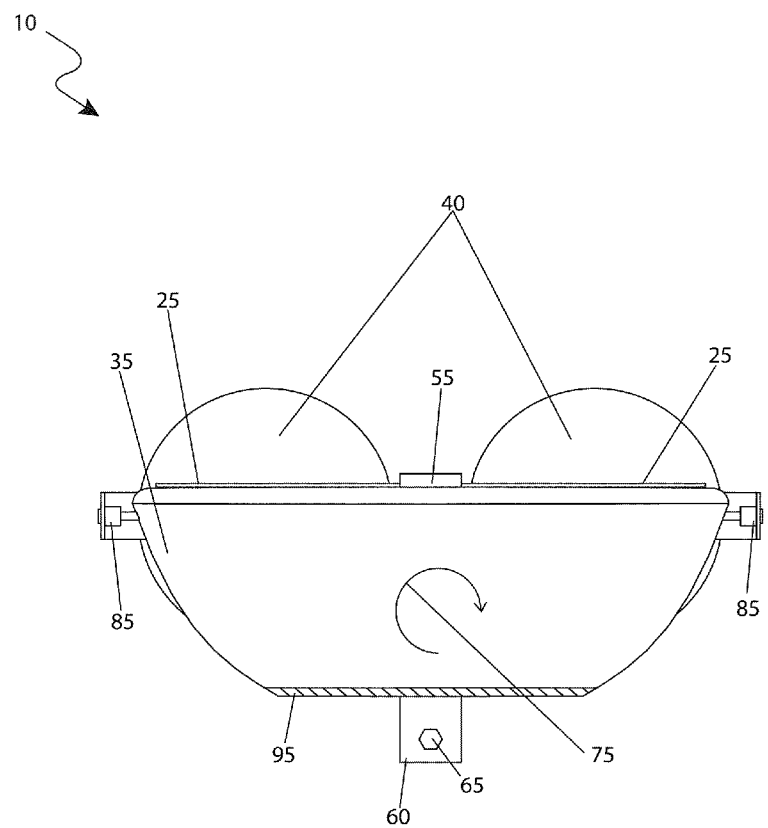
FIG. 3 is a front view of the gimbal-mounted pet dish 10 according to the preferred embodiment of the present invention; and, FIG. 4 is a top view of the gimbal-mounted pet dish 10 according to the preferred embodiment of the present invention.

Referring now to FIG. 3, a front view of the gimbal-mounted pet dish 10 according to the preferred embodiment of the present invention is disclosed. This figure more clearly shows the two (2) fastening means 40, depicted as large suction cups as aforementioned described. Additionally, the lower vertical member 55 along with the standoff 60 and fastener 65 are also visible. Finally, both rotatable mounting pins 85 are also visible in their role as anchoring the pet dish 35 in position. The "U"-shaped mounting frame 80 is of a spring nature, such that the user can pull the pet dish 35 free of its connection with the rotatable mounting pins 85. This would allow the pet dish 35 to be removed for cleaning, sanitizing, refilling, or even replacement should it be required. When replacing the pet dish 35 back within the "U"-shaped mounting frame 80, one engages one (1) side of the pet dish 35 in one (1) of the rotatable mounting pins 85, and then gently bends the "U"-shaped mounting frame 80 outward until the other rotatable mounting pins 85 can be engaged. The view and movement of the first direction path 75 is clearly visible in the orientation offered by this figure as well.

Figure 4:
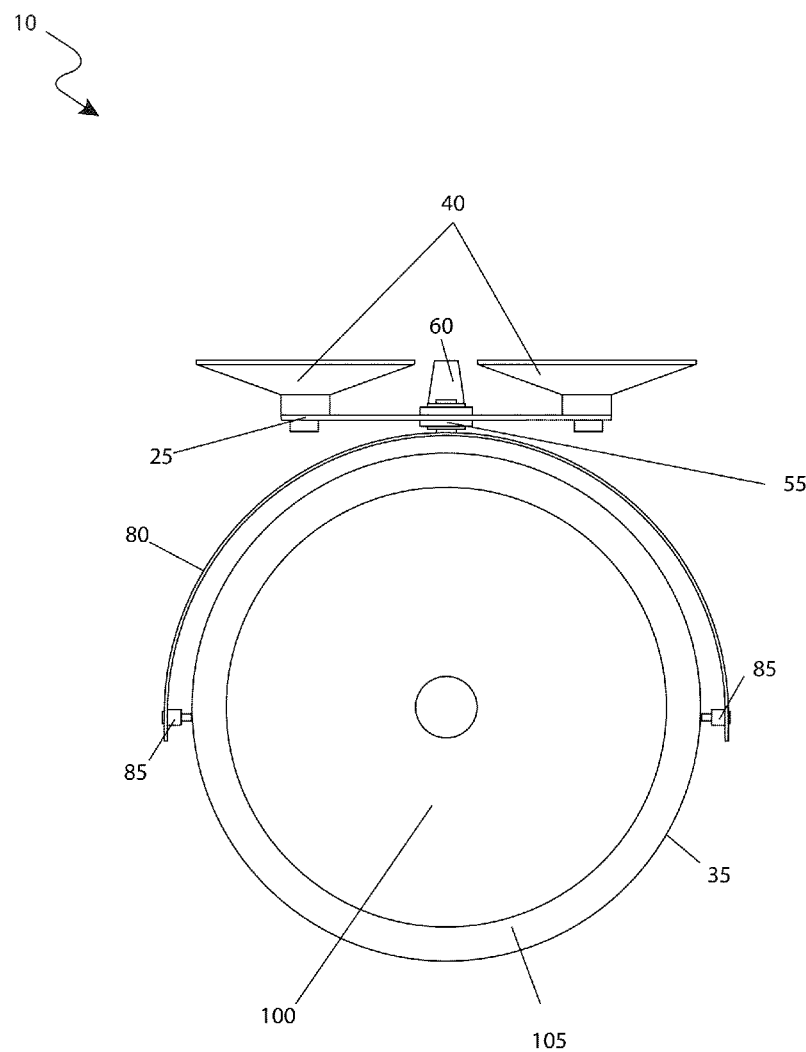

Referring finally, to FIG. 4, a top view of the gimbal-mounted pet dish 10 according to the preferred embodiment is shown. This figure clearly depicts the mounting frame 25, the fastening means 40, the lower vertical member 55 as well as the "U"-shaped mounting frame 80. It also depicts the pet dish 35 with its bowl opening 100 from which the pet eats or drinks. It should be noted that the bowl opening 100 is provided with an inward facing protrusion 105 or "lip" which is designed to reduce the tendency of water or other contents within the pet dish 35 to splash out while the moving environment 20 (as shown in FIG. 1) to which the gimbal-mounted pet dish 10 is attached is in motion. It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. It is envisioned that the gimbal-mounted pet dish 10 would be constructed in general accordance with FIG. 1 through FIG. 4. These teaching provide a base surface that moves in alignment with a vertical surface 15, but interfaces with two (2) rotating means, or gimbal mount to provide for the isolation of a pet dish from said movements. After procurement, the gimbal-mounted pet dish 10 would be fastened to the vertical surface 15 at a suitable position defined by the distance "d" 45 above a floor surface 50. Said distance "d" 45 would be dependent on the size or height of the pet. The exact fastening method would also vary depending on the exact construction and composition of the vertical surface 15. Should the vertical surface 15 be of a smooth surface, large suction cups as depicted on FIGS. 1-4 would be utilized. Other methods such as a hook-and-loop fastener, screws, double-sided foam adhesive tape, adhesive, or the like could also be utilized. At this point in time, the pet dish 35 would be filled with water or pet food in the typical manner. At this point in time, the gimbal-mounted pet dish 10 is ready for use.

During motion of the vertical surface 15 either by motion of a boat, motor vehicle, recreational vehicle, or other similar means, the gimbal-mounted pet dish 10 allows the pet dish 35 to remain horizontal with respect to the horizon and thus gravity. As such, the likelihood of product being spilled from the pet dish 35 attached to the gimbal-mounted pet dish 10 is greatly reduced. The inward facing protrusion 105 on the bowl opening 100 also aids in this effort. While it is not anticipated that the pet will be able to utilize the gimbal-mounted pet dish 10 during periods of excessive movement, mild movements of ten degrees (10°) or less along either the first direction path 75 or the second direction path 90 should allow utilization during movement.

When the pet dish 35 associated with the gimbal-mounted pet dish 10 requires cleaning or refilling, the user would simply remove the pet dish 35 from its "U"-shaped mounting frame 80 by pulling outward at the location of the rotatable mounting pins 85 to release the pet dish 35. After cleaning and/or refilling, the pet dish 35 can be replaced by reversing the above procedure thus allowing the gimbal-mounted pet dish 10 to be reused in a repeating manner as needed.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A gimbal-mounted pet dish, comprising:
   a mounting frame attachable to a vertical support surface with a fastening means;
   a pet dish comprising curved side walls and a bottom defining a cavity;
   a "U"-shaped mounting frame rotatably attached to said mounting frame so as to be rotatable relative to said mounting frame by a rotating bearing to maintain said "U"-shaped mounting frame at a substantially horizontal plane about an axis perpendicular to said mounting frame; and,
   a pair of mounting pins rotatable relative to said "U"-shaped mounting frame;
   wherein said mounting pins are provided on opposite upper external sides of said pet dish to rotatably mount said pet dish to opposing distal ends of said "U"-shaped mounting frame to maintain said pet dish at a substantially horizontal plane about an axis parallel to said mounting frame;
   wherein said fastening means is for removably attaching said pet dish to said vertical support surface at a desired height and location; and,
   wherein said rotating bearing and said pair of mounting pins support said pet dish at a substantially horizontal plane irrespective of a pitch or roll of said mounting frame.

2. The gimbal-mounted pet dish of claim 1, wherein said "U"-shaped mounting frame further comprises a rigid material having a flexing nature so as to allow said opposing distal ends to splay outward for attaching and removing said pet dish.

3. The gimbal-mounted pet dish of claim 2, wherein said "U"-shaped mounting frame further comprises a receiving aperture through each of said opposing distal ends for insertably engaging each of said pair of mounting pins.

4. The gimbal-mounted pet dish of claim 1, wherein said pair of mounting pins each comprise an annular flange slightly larger than said receiving aperture for limiting insertion thereof by contact an interior surface of said "U"-shaped mounting frame.

5. The gimbal-mounted pet dish of claim 1, wherein said mounting frame further comprises:
   a horizontal member affixed to said fastening means; and,
   a lower vertical member extending downward from said horizontal member;
   wherein said lower vertical member comprises a standoff affixed to a lower end of said horizontal member to provide a supported vertical mounting plane parallel to said vertical support surface.

6. The gimbal-mounted pet dish of claim 5, wherein said standoff further comprises a standoff distance equivalent to a distance between said mounting frame and said vertical support surface.

7. The gimbal-mounted pet dish of claim 1, wherein said pet dish further comprises an inwardly facing protrusion along an upper peripheral edge to provide a containment means for contents stored within said interior.

8. The gimbal-mounted pet dish of claim 1, wherein said fastening means further comprises at least one large suction cup.

9. The gimbal-mounted pet dish of claim 8, wherein said suction cup is affixed to an outside surface of said mounting frame.

10. The gimbal-mounted pet dish of claim 1, wherein said fastening means is selected from the group consisting of mechanical fasteners, adhesive tape, a hook and loop fastener, and an adhesive compound.

11. A gimbal-mounted pet dish, comprising:
   a mounting frame attachable to a vertical support surface with a fastening means;
   wherein said fastening means further comprises at least one large suction cup;
   wherein said suction cup is affixed to an outside surface of said mounting frame;
   a horizontal member affixed to said fastening means;
   a lower vertical member extending downward from said horizontal member;
   wherein said lower vertical member further comprises a standoff affixed to a lower end of said horizontal member to provide a supported vertical mounting plane parallel to said vertical support surface;
   a pet dish comprising curved side walls and a bottom defining a cavity and an inwardly facing protrusion along an upper peripheral edge to provide a containment means for contents stored therewithin;
   a "U"-shaped mounting frame hingedly attached to said mounting frame so as to be rotatable relative to said mounting frame with a rotating bearing;
   wherein said "U"-shaped mounting frame further comprises a rigid material having a flexing nature so as to allow distal ends to splay outward for attaching and removing said pet dish and a receiving aperture through each of said opposing distal ends for insertably engaging each of said pair of mounting pins;
   wherein said rotating bearing supports said pet dish thereat a substantially horizontal plane; and,
   a pair or mounting pins rotatable relative to said "U"-shaped mounting frame;
   wherein said pair of mounting pins are provided on opposite upper external sides of said pet dish to mount said pet dish to opposing distal ends of said "U"-shaped mounting frame to maintain a substantially horizontal plane about an axis parallel to said mounting frame.

12. A method of utilizing a gimbal-mounted pet dish, comprising the steps of:
   procuring said gimbal-mounted pet dish further comprising:
      a mounting frame attachable to a vertical support surface with a fastening means;
      a horizontal member affixed to said fastening means;
      a lower vertical member extending downward from said horizontal member;
      wherein said lower vertical member further comprises a standoff affixed to a lower end of said horizontal member to provide a supported vertical mounting plane parallel to said vertical support surface;
      a pet dish comprising curved side walls and a bottom defining a cavity and an inwardly facing protrusion along an upper peripheral edge to provide a containment means for contents stored therewithin;
      a "U"-shaped mounting frame hingedly attached to said mounting frame so as to be rotatable relative to said mounting frame with a rotating bearing;
      wherein said "U"-shaped mounting frame further comprises a rigid material having a flexing nature so as to allow distal ends to splay outward for attaching and removing said pet dish and a receiving aperture through each of said opposing distal ends for insertably engaging each of said pair of mounting pins; and,
      a pair or mounting pins rotatable relative to said "U"-shaped mounting frame;
      wherein said pair of mounting pins are provided on opposite upper external sides of said pet dish to mount said pet dish to opposing distal ends of said "U"-shaped mounting frame to maintain a substantially horizontal plane about an axis parallel to said mounting frame;
   fastening said pet dish to a vertical support surface at a suitable position defined by a vertical distance above a floor surface via said fastening means;
   filling a pet dish with water or pet food in the typical manner;
   allowing said pet dish to remain horizontal with respect to the horizon during motion of said vertical support surface;
   removing said pet dish by pulling said "U"-shaped mounting frame outward at the location of said pair of mounting pins to release said pet dish as desired; and,
   replacing said pet dish by reversing the above procedure thus allowing said pet dish to be reused in a repeating manner as needed.

13. The method of claim 12, wherein said fastening means further comprises at least one large suction cup affixed to an outside surface of said mounting frame.

14. The method of claim 13, wherein said step of fastening said pet dish to a vertical support surface at a suitable position defined by a vertical distance above a floor surface via said fastening means further comprises attaching at least one said suction cup to a smooth, nonporous surface via the use of suction.

* * * * *